United States Patent [19]
O'Brien et al.

[11] Patent Number: 5,210,650
[45] Date of Patent: May 11, 1993

[54] COMPACT, PASSIVELY ATHERMALIZED OPTICAL ASSEMBLY

[75] Inventors: Michael J. O'Brien; William B. Smith, both of Rochester, N.Y.

[73] Assignee: Eastman Kodak Company, Rochester, N.Y.

[21] Appl. No.: 860,936

[22] Filed: Mar. 31, 1992

[51] Int. Cl.$^5$ ............................................. G02B 7/02
[52] U.S. Cl. ..................................... 359/820; 385/33; 372/36
[58] Field of Search ............... 359/819, 820, 822, 823, 359/830; 385/32, 33; 372/9, 21, 27, 32, 98, 36

[56] References Cited

U.S. PATENT DOCUMENTS

| | | |
|---|---|---|
| 1,325,936 | 12/1919 | Fouasse . |
| 4,525,745 | 6/1985 | Ghaem-Maghami et al. ...... 359/820 |
| 4,656,635 | 4/1987 | Baer et al. ............................ 372/27 |
| 4,730,335 | 3/1988 | Clark et al. .......................... 372/98 |
| 4,861,137 | 8/1989 | Nagata ................................. 359/820 |
| 4,993,801 | 2/1991 | Sarraf ................................... 359/820 |

FOREIGN PATENT DOCUMENTS

| | | |
|---|---|---|
| 2830341 | 1/1979 | Fed. Rep. of Germany ...... 359/820 |
| 58-203405 | 11/1983 | Japan . |
| 59-15204 | 1/1984 | Japan ................................... 359/820 |
| 59-15205 | 1/1984 | Japan ................................... 359/820 |
| 59-15206 | 1/1984 | Japan ................................... 359/820 |
| 59-81605 | 5/1984 | Japan ................................... 359/820 |
| 3-179420 | 8/1991 | Japan ................................... 359/820 |
| 127800 | 10/1918 | United Kingdom . |

Primary Examiner—Loha Ben
Attorney, Agent, or Firm—Mark Z. Dudley

[57] ABSTRACT

An optical assembly comprises a light beam source, a collimating lens, and a passive thermally-compensated structure. Concentric rings of dissimilar material are supported by a baseplate and arranged to support a flexure plate at a predetermined distance above the baseplate. The collimating lens is mounted on the flexure plate. A difference in the thermal coefficient of expansion of the rings is chosen so that the flexure plate moves to compensate for thermal shifts in system focal length, while maintaining radial and angular alignment of the lens relative to the laser diode source, so as to provide controlled axial movement of the collimating lens.

12 Claims, 5 Drawing Sheets

COMPACT, PASSIVELY ATHERMALIZED OPTICAL ASSEMBLY

BACKGROUND OF THE INVENTION

The present invention relates to means for effecting temperature-compensation of focal length in an optical assembly.

Certain optical assemblies such as those found in laser output scanners require a stable monochromatic collimated light beam provided by a laser diode and a collimating lens. For adequate optical performance, the beam source must maintain a predetermined beam quality over a wide ambient temperature range. In conventional apparatus, the beam source and lens are mounted in a mechanical structure that attempts to maintain the beam focal length while the apparatus undergoes temperature-induced structural changes. Hence, the thermal compensation is effected either passively or actively.

Passive compensation systems rely on the differences in coefficients of thermal expansions of the various elements in the optical system such that there is minimal net focus shift with temperature. The conventional approach is to employ concentric tube systems, which, if constructed from common materials, are too large or bulky. For example, U.S. Pat. No. 4,730,335 discloses a series of interlocking tubes each carrying a single optical element of an optically-pumped solid-state laser. Such an apparatus is too large to be suitable for many applications.

U.S. Pat. No. 4,861,137 discloses a mounting device for a lens used to refract a light beam, wherein the lens is supported by doughnut-shaped bimetal components which deflect according to the ambient temperature. This approach can be moderately effective for supporting lenses having diameters under approximately 1 cm. However, the motion of the bimetal components is not fully constrained, and the lens undergoes a tilted and/or tipped motion relative to the optical axis. The boundary conditions inherent in the disclosed design thus allow linear motion of the lens over but a very small range of motion. The disclosed approach is therefore unsuitable for effecting fine adjustment of lens position over a large range of motion. Moreover, the disclosed bimetal components suffer from a temperature gradient over their radial dimension; thus rendering the temperature compensation less accurate and less effective than desireable.

Prior art approaches that rely on active control (for example, wherein heating elements or thermoelectric coolers are used) have several inherent disadvantages. For example, a thermoelectric cooler is employed in the apparatus disclosed in U.S. Pat. No. 4,604,753 to stabilize the output power and wavelength of a laser diode beam source; U.S. Pat. Nos. 4,656,635 and 4,993,801 disclose a beam source wherein a thermoelectric cooler is employed to control the operating temperature of the entire head. These apparatus are expensive to construct and require an external power source.

SUMMARY OF THE INVENTION

A compact, passively athermalized optical assembly may be constructed according to the present invention wherein an optical assembly comprises a laser beam source, such as a laser diode, and a collimator lens which are together mounted in a passive thermally-compensated structure. The laser diode source is mounted on a baseplate that may be attached to a heat sink or cooling apparatus and serves as the assembly mounting surface. The collimating lens is mounted on a flexure plate having a kinematic hinge. The flexure plate is supported by concentric rings of dissimilar materials that are arranged to support the flexure plate at a predetermined distance above the base. The difference in the coefficient of thermal expansion (CTE) of each ring is chosen such that the flexure plate kinematic hinge is operated to compensate for thermal shifts in system focal length while maintaining radial and angular alignment of the lens relative to the laser diode source, so as to provide controlled axial movement of the collimating lens.

The invention, its objects, and advantages, will become more apparent in the detailed description of the preferred embodiments presented below.

DETAILED DESCRIPTION OF THE PREFERRED EMBODIMENTS

Figure 1:
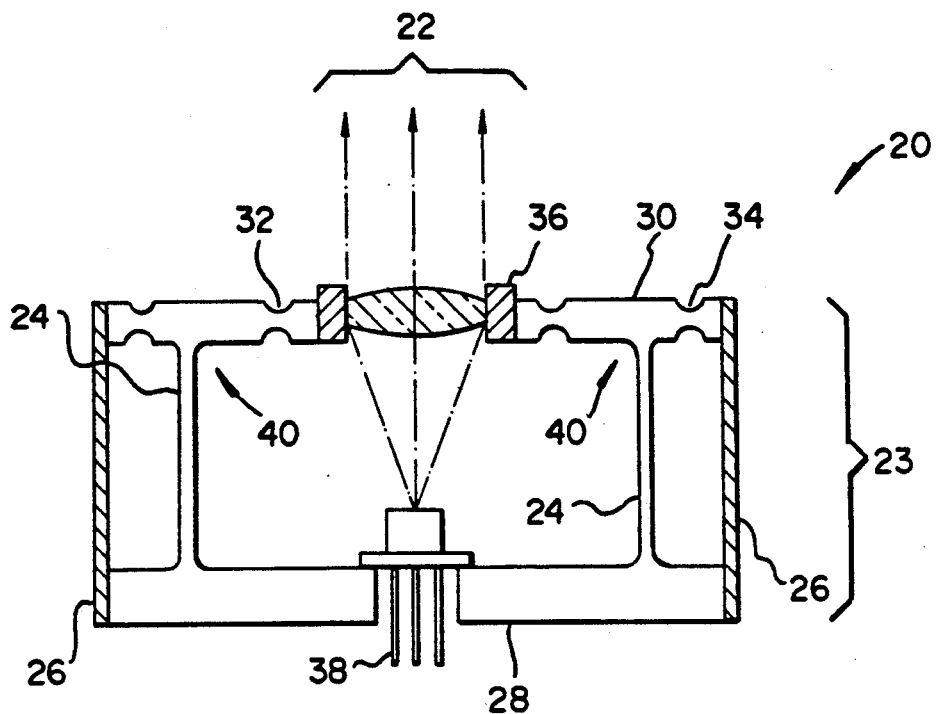
FIG. 1 is a simplified side sectional view of an optical assembly constructed according to the present invention.

Preferred embodiments of the present invention will now be described with reference to the accompanying drawings, wherein like reference numerals refer to like components.

As shown in FIG. 1, a preferred embodiment of the present invention may be constructed as an athermalized optical assembly 20 for use in providing a collimated laser beam 22 of essentially constant quality over a wide range of operating temperature. A cylindrical thermally-compensated structure 23 includes outer and inner compensation rings 24, 26 each attached between a baseplate 28 and a flexure plate 30. A kinematic hinge, preferably in the form of circular notches 32, 34 in the flexure plate, allows localized deformation at the flexure plate at one or more portions of the plate 30. The baseplate 28 is of sufficient thickness and rigidity that any deformation therein is insignificant relative to the deformation experienced by the flexure plate 30. The structure 23 serves to athermally align a collimating lens 36, located in the flexure plate 30, with the optical axis of the light beam 22, The beam source is preferably in the form of a laser diode 38, fixed in the baseplate 28. Radial and angular alignment of the lens 36 to the diode 38 is maintained due to the cylindrical geometry of the structure 23.

The contemplated response of the compensation rings 24, 26 to a temperature shift produces an axial motion of the lens 36 with respect to the beam source so as to correct for focal length shifts that would otherwise occur. Materials for the compensation rings 24, 26 are chosen to have different coefficients of thermal expansion ($\alpha_1$ and $\alpha_2$), such that each ring experiences change in height as the temperature changes. Because the kinematic hinge is operable in the upper flexure plate 30 for small deflections, the lens 36 will move axially due to the "lever" action about a fulcrum point 40 located at the top of the inner compensation ring 24.

Figure 2:
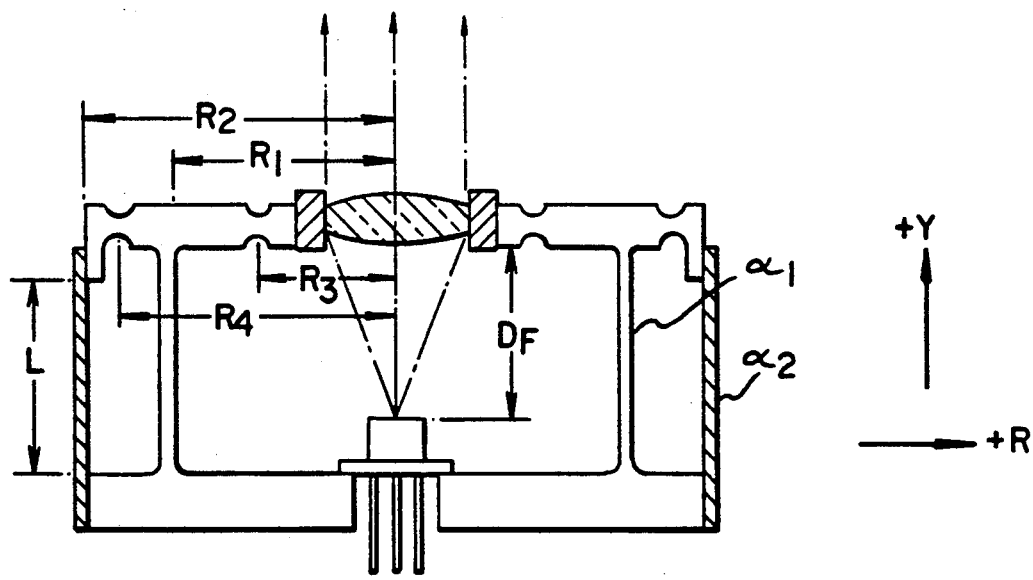
FIG. 2 is a side sectional view of the assembly of FIG. 1.

Important dimensions are illustrated in FIG. 2. The degree of kinematic movement of the collimating lens can be controlled by several factors. A variety of temperature compensation effects can be obtained for a given ring height L by varying the dimensions of the hinged sections of the flexure plate 30 and the inner and outer ring placements. Because the stiffness of the flexure plate at the hinge points (notches 32, 34) is very low compared to the stiffness of the bulk material in the remainder of the flexure plate, the radial level arm input and output values are set by the radial amounts $R_4$ and $R_3$, respectively. A fulcrum position 40 is established by choosing an inner compensation ring radius $R_1$, at a predetermined point between $R_3$ and $R_4$. This levering arrangement provides an amplification or reduction of mechanical displacement that depends upon the ratio of ($R_4-R_1$) to ($R_1-R_3$). Kinematic hinge operation is independent of the outer compensation ring radius $R_2$ because the flexure plate 30 bulk thickness is selected such that the bending moment is transmitted directly to the hinge area at $R_4$. Also, because the compensation rings 24, 26 have different coefficients of thermal expansion ($\alpha_1$ and $\alpha_2$), an input to the lever system is proportional to the ring length L, the CTE difference ($\alpha_1 - \alpha_2$), and the change in temperature $\Delta T$ experienced by the structure. It is contemplated that those skilled in the art will optimize the geometry of the structure 23 by varying the foregoing parameters, to minimize sensitivity to manufacturing tolerances, or for other reasons. For example, if desired, the flexure plate response may be made nonlinear by use of a flexure plate having a stiffness that varies according to its radial dimension. The assembly is also contemplated as being initially aligned and focused during its assembly by techniques known in the art.

Figure 3:
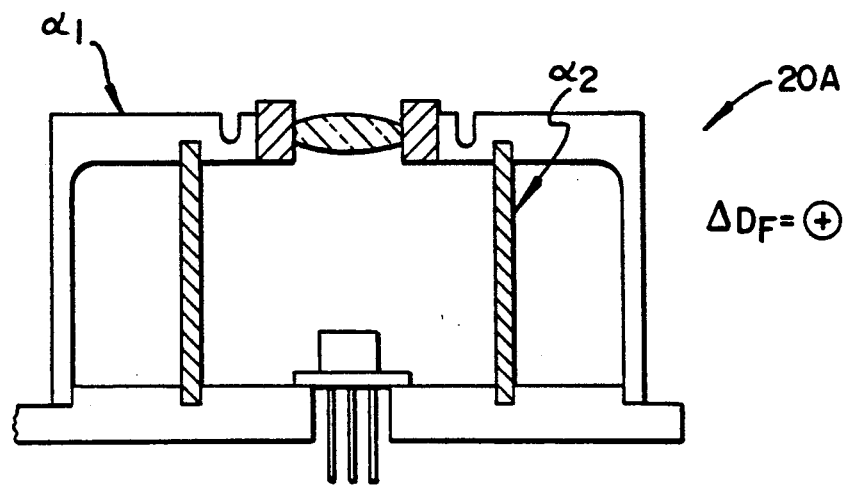
FIGS. 3 and 4 are side sectional views of the assembly of FIG. 1, showing alternative constructions that effect a respective increase or decrease in focal distance in response to increasing ambient temperature.
Figure 4:
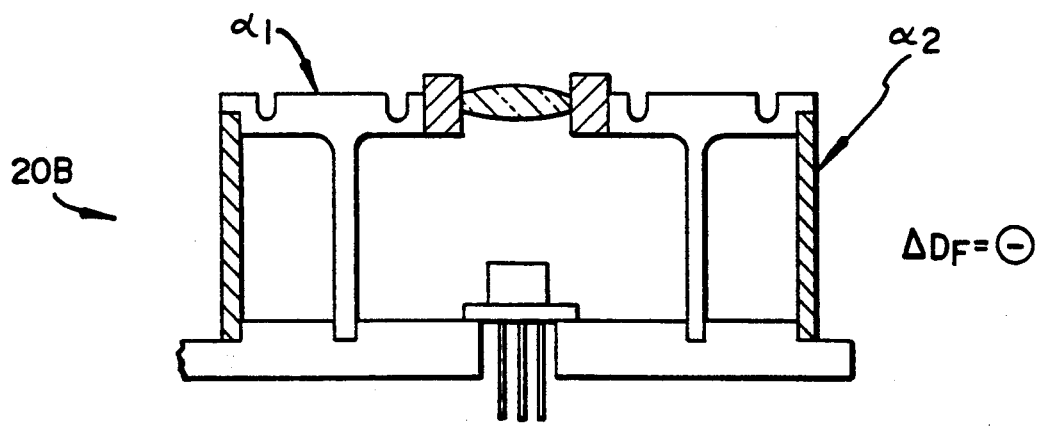
Figure 4A:
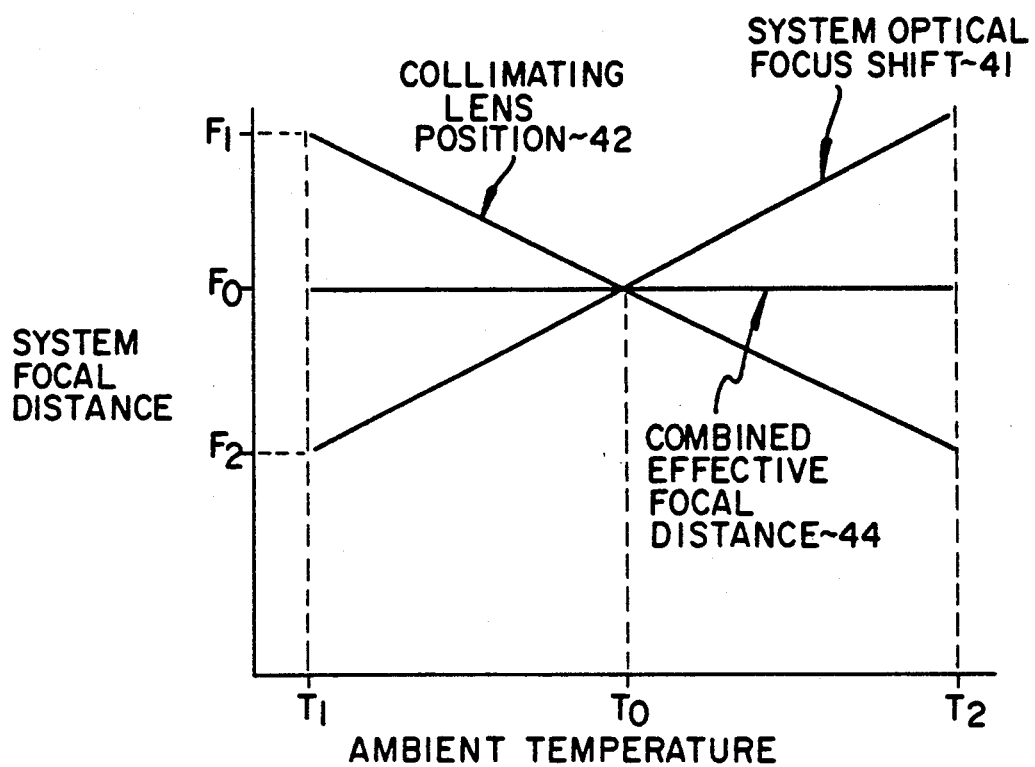
FIG. 4A is a graphical representation of the optical assembly focal distance according to ambient temperature.

FIG. 3 illustrates a first alternative optical assembly 20A wherein $\alpha_2$ is greater than $\alpha_1$, whereby an increase in focal distance is effected with an increase in ambient temperature. FIG. 4 illustrates a second alternative optical assembly 20B whereby a decrease in focal distance is effected with an increase in ambient temperature. FIG. 4A graphically illustrates an example of the focal shift effected by a proper selection of materials and an appropriate construction of the assemblies 20, 20A, or 20B. The system optical focus shift 41 includes the effects of changes in lens focal length and the relative beam source position. The collimating lens position change 42 exactly compensates the focus shift 41, whereby the laser beam focal distance 44 (and hence the beam spot size at the focal plane) may be maintained over the entire operating range of the optical assembly. Due to the nature of the collimating lens construction, the focus shift 41 is linear; although a positive shift is illustrated the focus shift may be either positive or negative. Nonetheless, the contemplated assembly may be constructed so as to fully compensate for focus shifts at temperatures below (e.g., $T_1$) and above (e.g., $T_2$) the normal operating value ($T_0$).

Figure 4B:
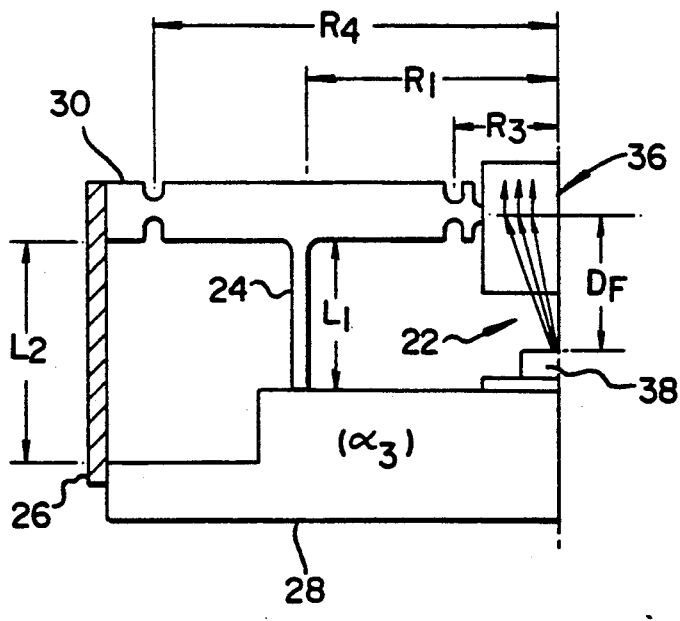
FIG. 4B is a side sectional view of a portion of an alternative embodiment of the assembly of FIG. 1, with only the assembly portion that is distal to the center line being illustrated for simplicity.

As shown in FIG. 4B, ring lengths $L_1$, $L_2$ and the coefficients of thermal expansion ($\alpha_1$ and $\alpha_2$); as well as the CTE of the base, ($\alpha_3$) may be varied, and once the change $D_f$ in optical system focus length (optical and mechanical) with temperature has been determined, the values of $L_1$, $L_2$, $\alpha_1$, $\alpha_2$, and $\alpha_3$ may be optimized based on the relationship:

$$D_F = L_1\alpha_1 \left[ \frac{R_1 - R_3}{R_4 - R_1} \right][L_2(\alpha_2 - \alpha_3) + L_1(\alpha_3 - \alpha_1)] \quad (1)$$

where:
$L_1$ = inner compensation ring length
$L_2$ = outer compensation ring length
$R_1$ = inner compensation ring radius
$R_3$ = inner hinge radius
$R_4$ = outer hinge radius
$\alpha_1$ = inner compensation ring CTE
$\alpha_2$ = outer compensation ring CTE
$\alpha_3$ = base material CTE For the case where the compensation rings are of equal length:

$$D_F = L \left[ \alpha_1 - (\alpha_2 - \alpha_1)\frac{R_1 - R_3}{R_4 - R_1} \right] \quad (2)$$

Figure 5:
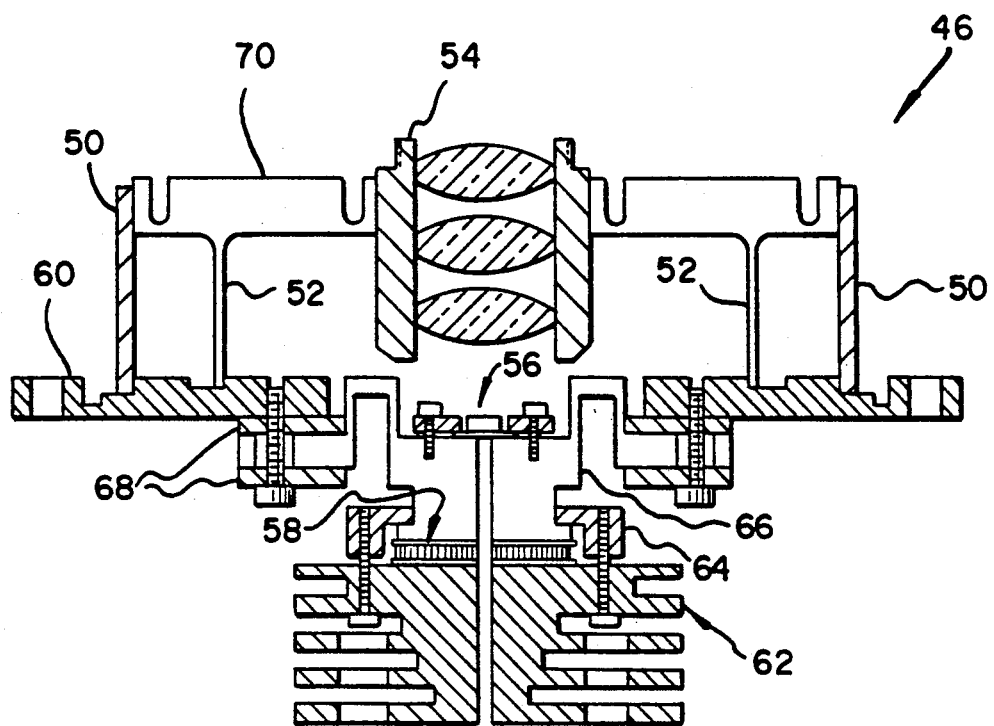
FIGS. 5 and 6 are side sectional views of still further embodiments of the assembly of FIG. 1, constructed especially for use in a high resolution laser writer.
Figure 6:
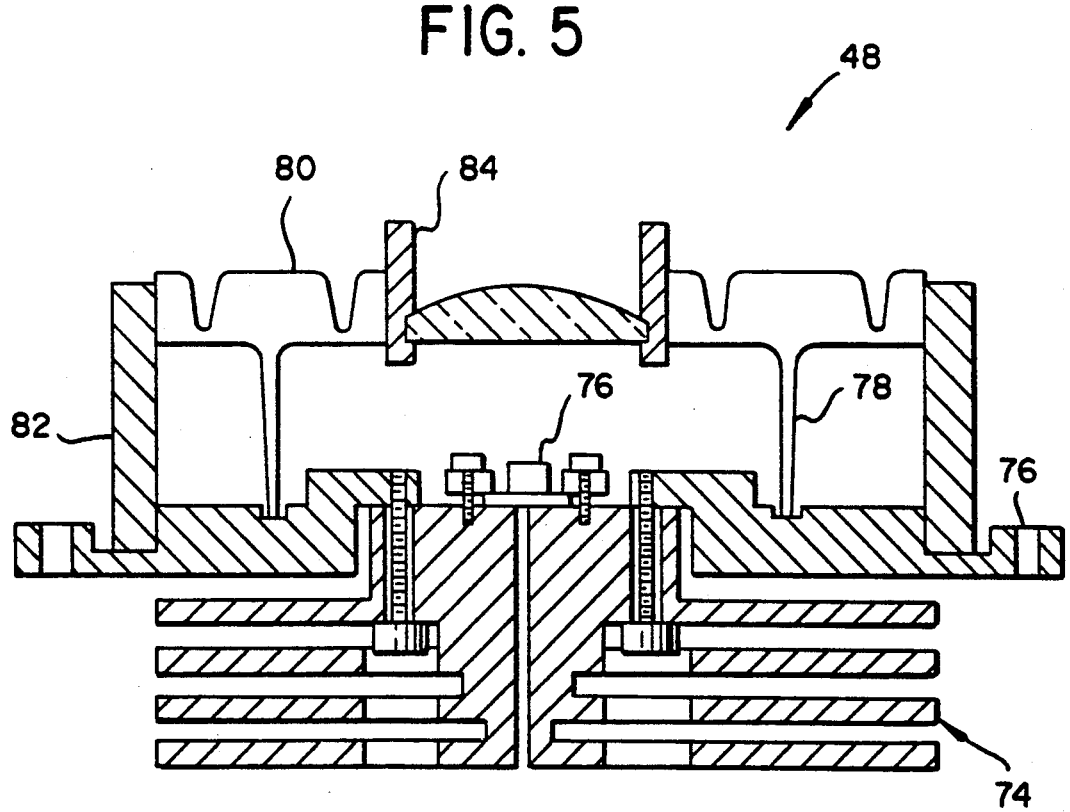
Figure 7:
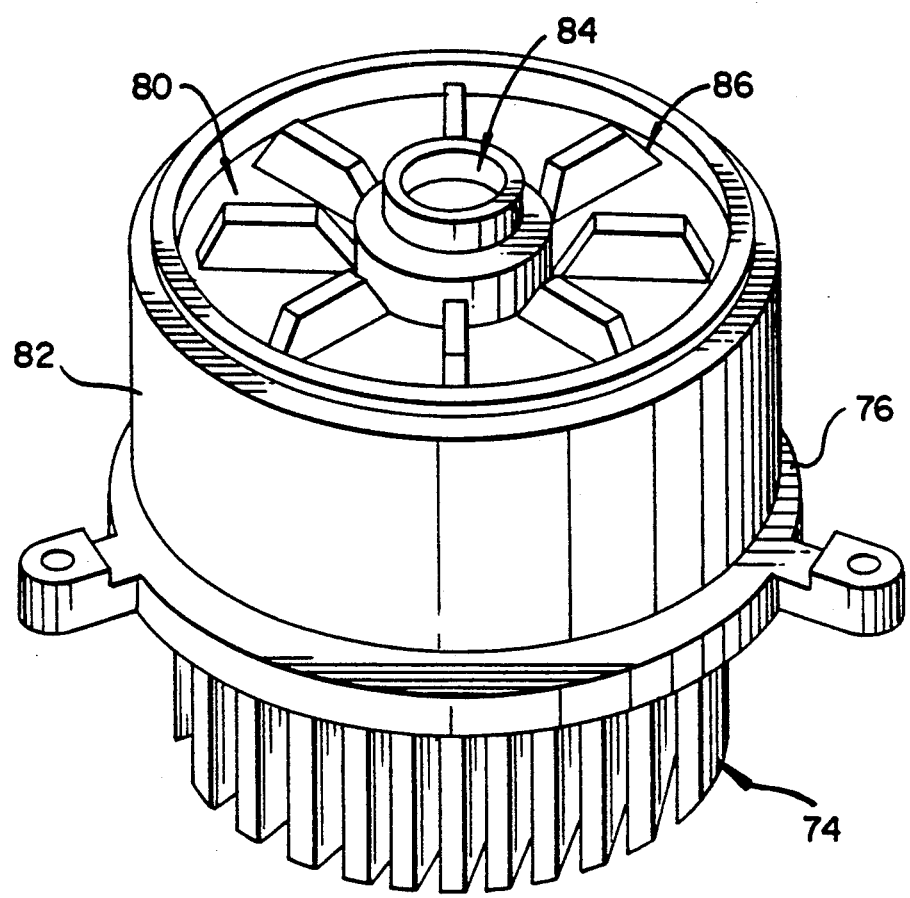
FIG. 7 is a side perspective view of the assembly of FIG. 6.

Generally the above-listed thermal coefficients will be defined by the materials and manufacturing methods selected in producing the assembly. $R_3$, $R_4$, $D_f$, and $L_2$ are typically defined according to the lens characteristics and available space, leaving $L_1$ and $R_1$ selectable for establishing the desired degree of thermal compensation. Further, it is believed that to reduce effects of manufacturing tolerances, one would:

a. maximize $(R_4-R_3)/(R_1-R_3)$;
b. minimize $\alpha_1$;
c. maximize $(\alpha_2 L_2)/(\alpha_1 L_1)$; and
d. set $(R_4-R_3)/(R_1-R_3)=(\alpha_2 L_2)/(\alpha_1 L_1)$ Exemplary embodiments 46, 48 of the present invention were constructed as illustrated in FIGS. 5, 6, and 7. The construction of an athermalized optical head assembly 46, designed for high resolution output writers requiring less than 0.5 micron focal distance variation, is illustrated in FIG. 5. The available space in the output writer limited the design of the assembly 46 to:

$R_4$ = 1.43 inches
$L_2$ = 0.60 inch
$R_3$ = 0.575 inch.

For ease of manufacturing and assembly, the outer compensation ring 50 was made of aluminum ($\alpha = 13.3 \times 10^{-6}$ in/in/°F), and the inner compensation ring 52 was made of 316 stainless steel ($\alpha = 9.2 \times 10^{-6}$ in/in/°F), and rings were cut to the same length. The focus shift was measured to be $$\sigma = -6.5 \times 10^{-6} \text{ in/°F}$$

and an appropriate inner compensation ring radius $R_1$ was calculated directly as $R_1$ = 1.14 inches.

The several coefficients of thermal expansion were chosen to produce a collimating lens 54 motion opposite to that of the focus shift.

In the embodiment illustrated in FIG. 5, the beam source 56 was a Hitachi Model HL7806G laser diode. A Marlow Industries Model SD1507 thermoelectric cooler (modified to include a center hole for wire routing) 58 was clamped between the base 60 and a 6061-T6 black anodized aluminum radial fin heat sink 62. A pair of half collar rings 64 clamped the thermoelectric cooler 58, thus minimizing stress in the thermoelectric cooler interface. The athermalized laser diode mount 66 was mounted to a baseplate 60 formed of 316 stainless steel. Teflon insulating washers 68 provided a high thermal resistance and isolated the diode mount 66 from the mounting base. This configuration allows the thermoelectric cooler 58 to remove heat from the diode mount 66 only.

The flexure plate 70 an inner compensation ring 52 were machined from a single piece of 316 stainless steel. Electron beam welding techniques were used to attach the inner compensation ring 52 to the baseplate 60. The outer compensation ring 50, made of 6061-T6 aluminum, was then epoxied to the baseplate 60 and flexure plate 70. An optical alignment fixture was used to position the lens 54 (a Special Optics Model 54-17-15-2 collimator lens) in a slightly oversize hole in the flexure plate 70. Radial and angular alignment as well as focus were obtained while the laser diode 56 was operating, and epoxy was used to fill the lens/plate interface to set the lens in position.

A low cost, low resolution optical assembly 48 suitable for applications that can accommodate focus shifts of up to 2 microns is illustrated in FIG. 6. The heat sink 74 was designed to accommodate a beam source in the form of a distributed feedback semiconductor laser diode 76. The inherent stability of such the laser diode then reduces the need for beam source heat dissipation and therefore a thermoelectric cooler is not required, and instead the low level heat from the laser diode may be cooled by the passive heat sink 74. The baseplate 76, inner compensation ring, and flexure plate may be molded from 15% to 30% glass filled polycarbonate, while the outer compensation ring 82 may be made of aluminum or stainless steel, depending on the type of collimator lens 84 that is selected. Preferably, the lens 84 would be an aspherical collimator lens, such as a Kodak No 98-A-389 collimating lens.

As illustrated in FIG. 7, a flexure plate 80 includes eight ribs 86 on a thin wall structure creating the kinematic hinge as already discussed with respect to FIG. 1. Since the baseplate 76 is made of similar material, a solvent bond may be used to connect the inner compensation ring 78 to the baseplate 76, and epoxy may be used to bond the outer compensation ring 82 to the flexure plate 80 and baseplate 76. Lens alignment and focus are achieved as already described with respect to FIG. 5; however, solvent bonding would be used to secure the preferred lens 84. It is also anticipated that a single element lens could be molded directly into the flexure plate 80 for less critical applications.

A compact, passively athermalized optical assembly constructed acording to the present invention affords the following, and other, benefits and advantages. The components of the assembly may be easily produced and can be successfully designed to minimize component sensitivity to manufacturing tolerances. The assembly may be standardized in a compact size that is nonetheless suitable for addressing a wide range of thermal compensation requirement. The compact design has less mass, thus allowing faster thermal response. In contrast to the lesser number of parameters available for compensation in prior art passive compensation schemes, the present invention allows optimal thermal compensation by varying three sets of control parameters (L, R, $\alpha$) and therefore offers great thermal compensation accuracy and control. It is also contemplated that the assembly may be constructed so as to be filled with inert gas before final lens alignment, and thus offers both a degree of mechanical protection and a sealed environment for the beam source.

The invention has been described in detail with particular reference to the preferred embodiments thereof, but it will be understood that variations and modifications can be effected within the spirit and scope of the invention.

What is claimed is:

1. Apparatus for providing athermalized collimation of a beam source by a beam collimating means, comprising:

support means for fixing the beam source at a predetermined position thereon and for thereby defining a light beam optical axis;

flexure plate adapted for aligning the collimating means at a beam collimating means position on the optical axis, and having a kinematic hinge operable to displace the collimating means along the optical axis;

thermal compensation means operatively connected between the support means and the flexure plate, the thermal compensation means having a selected thermal response and being located with respect to the kinematic hinge so as to operate the kinematic hinge and thereby displace the collimating means.

2. The apparatus of claim 1, wherein the thermal compensation means comprises an inner compensation ring located at a first predetermined radius $R_1$ from the optical axis and having a selected coefficient of expansion $\alpha_1$ and an outer compensation ring located a second predetermined radius $R_2$ from the optical axis and having a selected coefficient of expansion $\alpha_2$, and the support means further comprises a baseplate having a coefficient of thermal expansion $\alpha_3$.

3. The apparatus of claim 2, wherein the outer ring is formed of material substantially similar to the flexure plate.

4. The apparatus of claim 3, and wherein the kinematic hinge includes a radial notch in the flexure plate located between $R_1$ and the optical axis.

5. The apparatus of claim 2, wherein the kinematic hinge further comprises;

a first radial notch located in the flexure plate between the outer ring and the optical axis; and a second radial notch located in the flexure plate between between the inner and outer rings.

6. The apparatus of claim 5, wherein the first compensation rings has length $L_1$, the outer compensation ring has length $L_2$, the first notch location has radius $R_3$, and the second notch location has radius $R_4$ and the optical assembly has focus distance $D_F$, the optical assembly being optimized according to the relationship:

$$D_F = L_1\alpha_1 \left[ \frac{R_1 - R_3}{R_4 - R_1} \right] [L_2(\alpha_2 - \alpha_3) + L_1(\alpha_3 - \alpha_1)]. \tag{1}$$

7. The apparatus of claim 1, wherein the support means includes the light beam source.

8. The apparatus of claim 7, wherein the beam source further comprises a semiconductor laser diode.

9. The apparatus of claim 8, wherein the semiconductor laser diode is a distributed-feedback laser diode.

10. The apparatus of claim 7, wherein the support means further comprises means for dissipating heat from the beam source.

11. The apparatus of claim 10, wherein the heat dissipation means further comprises a thermoelectric cooler.

12. The apparatus of claim 10, wherein the heat dissipation means further comprises a passive heat sink.

* * * * *